UNITED STATES PATENT OFFICE.

J. T. TROTTER, OF NEW YORK, N. Y.

IMPROVEMENT IN VULCANIZING INDIA-RUBBER.

Specification forming part of Letters Patent No. 7,816, dated December 3, 1850.

*To all whom it may concern:*

Be it known that I, JONATHAN T. TROTTER, of the city, county, and State of New York, have invented a new and Improved Process for Curing or Preparing or Vulcanizing India-Rubber; and I do hereby declare the following to be a full and exact description of the same.

The nature of my invention consists in the new and useful manner in which I prepare the rubber by means of an article or preparation of zinc.

The process of preparing the said preparation of zinc is as follows: In a solution of caustic lime, potash, or any other caustic alkali I boil flowers of sulphur till the liquor is completely saturated. Through the lixivium thus formed I pass a stream of sulphurous-acid gas, obtained by any of the usual processes and apparatus, for the purpose of obtaining a hyposulphite of potassa or other alkaline base. Having obtained this result the liquor is allowed to stand and cool, when the clear liquor is decanted into another vessel containing a suitable quantity of the saturated solution of the nitrate or other analogous salt of zinc. On the mixture of these two solutions a decomposition takes place and the zinc is precipitated in the form of a white powder, which may be called a "hyposulphite of zinc." In this state it is washed and filtered and exposed to dry, after which it is ground in an ordinary paint-mill till it becomes an impalpable powder. It is then mixed and ground with the india-rubber (in the ordinary mills for that purpose) in the proportion of about three pounds of the hyposulphite of zinc to about ten pounds of rubber; and the composition, after being subjected to a heat for about three to five hours to a temperature of 260° to 280° Fahrenheit, according to the thickness of the material and the purpose to which it is to be applied, is found to be completely and perfectly cured or vulcanized. As a new and useful compound material for curing india-rubber, it possesses many advantages over all other processes heretofore known or used. It has none of the taint nor offensiveness peculiar to sulphur-cured goods, nor the peculiarly objectionable characteristics of lead-cured goods, on account of their being black, or their liability to become so when exposed to the action of sulphureted gases, but, on the contrary, possesses a fine white (or nearly so) color, susceptible of being made up into all kinds of goods, and of variegated patterns, and under all circumstances, from its almost inodorous flavor.

Having now described my invention or discovery of a new and useful mode of curing india-rubber, I will proceed to state what I claim and desire to secure by Letters Patent.

What I claim, therefore, is—

The use and employment of zinc, prepared by the process above described, whereby a hyposulphite or similar preparation of zinc is obtained, in combination with india-rubber, for the purpose of curing or vulcanizing it, substantially as hereinbefore set forth, without the use of free sulphur in any way in combination with the rubber.

JONATHAN T. TROTTER.

Witnesses:
CHARLES L. BARRETT,
LEWIS TOWSON VOIGT.